US009285668B2

(12) United States Patent
Abele et al.

(10) Patent No.: US 9,285,668 B2
(45) Date of Patent: Mar. 15, 2016

(54) MEMS MICRO-MIRROR DEVICE

(71) Applicant: Intel Corporation, Santa Clara, CA (US)

(72) Inventors: Nicolas Abele, Demoret (CH); Faouzi Khechana, Preverenges (CH); Lucio Kilcher, Montreux (CH)

(73) Assignee: INTEL CORPORATION, Santa Clara, CA (US)

( * ) Notice: Subject to any disclaimer, the term of this patent is extended or adjusted under 35 U.S.C. 154(b) by 1 day.

(21) Appl. No.: 13/706,142

(22) Filed: Dec. 5, 2012

(65) Prior Publication Data

US 2013/0094003 A1   Apr. 18, 2013

Related U.S. Application Data

(63) Continuation of application No. PCT/EP2010/059386, filed on Jul. 1, 2010.

(51) Int. Cl.
| | |
|---|---|
| *G03B 21/28* | (2006.01) |
| *G02B 26/08* | (2006.01) |
| *G02B 26/10* | (2006.01) |
| *G02B 26/00* | (2006.01) |
| *G03B 21/14* | (2006.01) |

(52) U.S. Cl.
CPC .............. *G03B 21/28* (2013.01); *G02B 26/00* (2013.01); *G02B 26/0833* (2013.01); *G02B 26/101* (2013.01); *G03B 21/14* (2013.01); *Y10T 29/49* (2015.01)

(58) Field of Classification Search
CPC .... G02B 6/3512; G02B 26/085; G02B 26/00; G02B 26/0833; G02B 26/101; G02B 26/10; G03B 21/14; G03B 21/28; B81B 7/00
USPC .............. 359/196.1, 200.7, 212.1; 353/98, 99
See application file for complete search history.

(56) References Cited

U.S. PATENT DOCUMENTS

| | | | | |
|---|---|---|---|---|
| 2002/0176657 | A1* | 11/2002 | Burke et al. .................... | 385/18 |
| 2004/0105616 | A1* | 6/2004 | Kazama et al. ................. | 385/18 |
| 2006/0255250 | A1* | 11/2006 | Chong ..................... | 250/227.11 |
| 2007/0053035 | A1* | 3/2007 | Cho et al. ...................... | 359/201 |
| 2008/0123167 | A1* | 5/2008 | Weiss et al. ................... | 359/198 |

FOREIGN PATENT DOCUMENTS

| | | |
|---|---|---|
| EP | 1927879 A2 | 6/2008 |
| JP | 2005181566 A | 7/2005 |

OTHER PUBLICATIONS

International Search Report for PCT/EP2010/059386, mailed May 13, 2011, European Searching Authority.

\* cited by examiner

*Primary Examiner* — Sultan Chowdhury
*Assistant Examiner* — Danell L Owens
(74) *Attorney, Agent, or Firm* — Kacvinsky Daisak Bluni PLLC

(57) ABSTRACT

A MEMS micro-mirror device includes, a single package; a first mirror and second mirror, wherein at least one of the mirrors is configured to oscillate along an oscillation axis; wherein both mirrors are located within the single package and are arranged such that as the at least one mirror oscillates, the light incident on the first micro-mirror can be deflected to the second mirror.

18 Claims, 16 Drawing Sheets

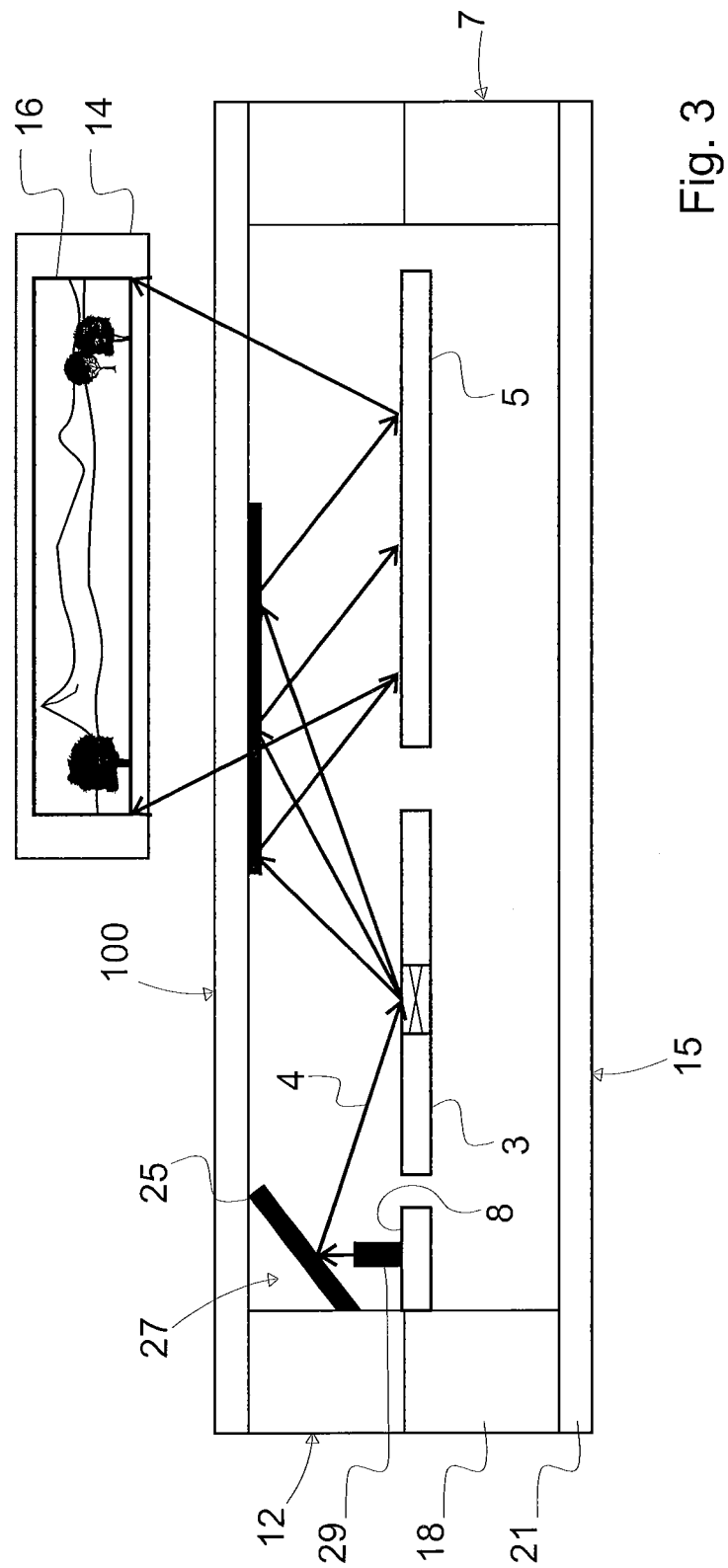

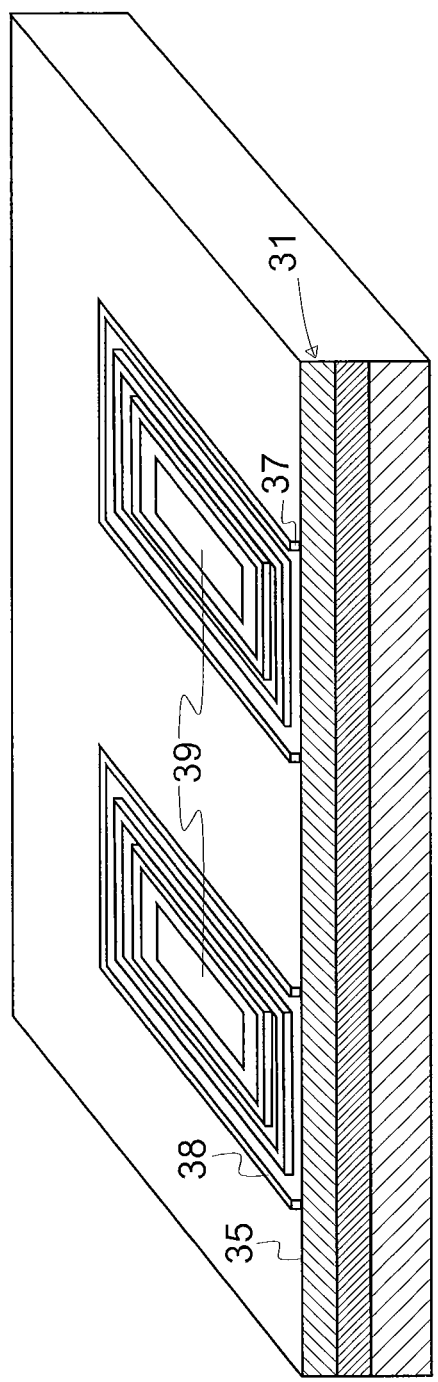
Fig. 4a(ii)

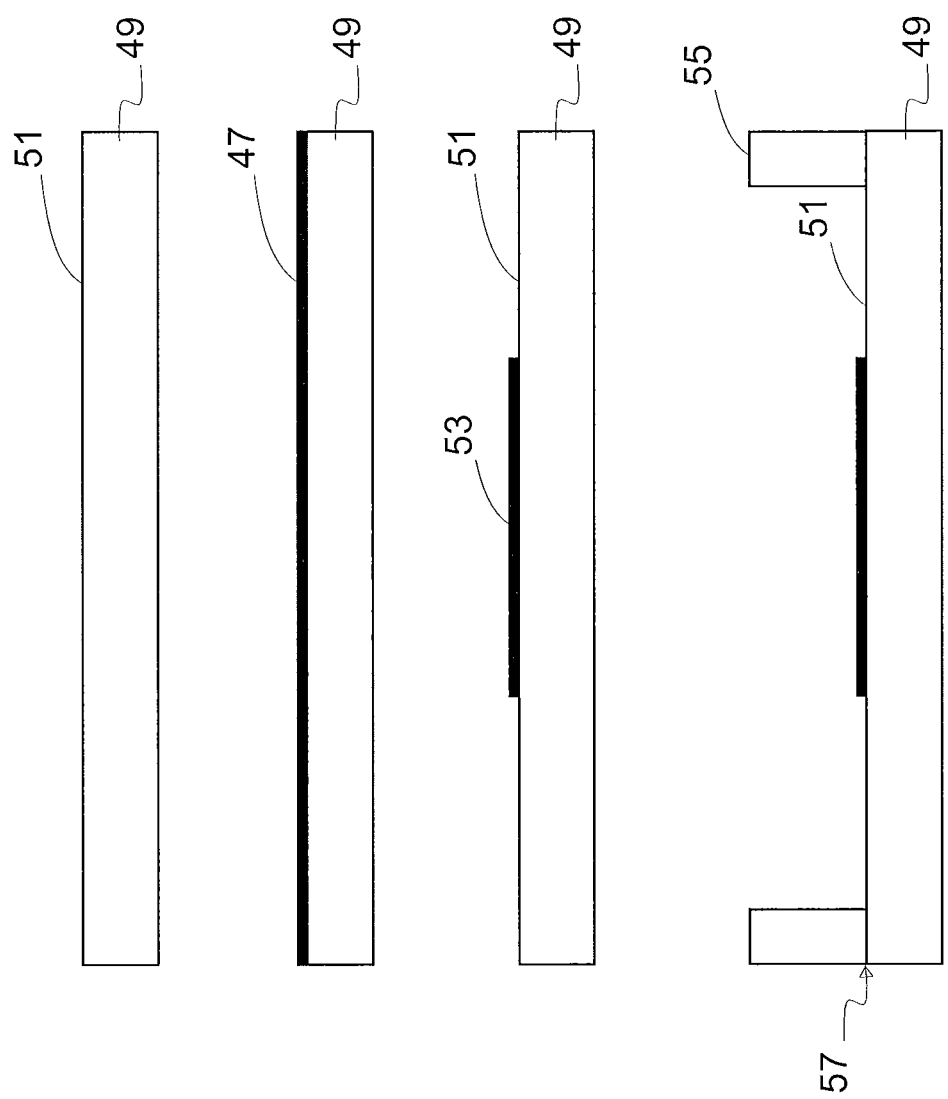

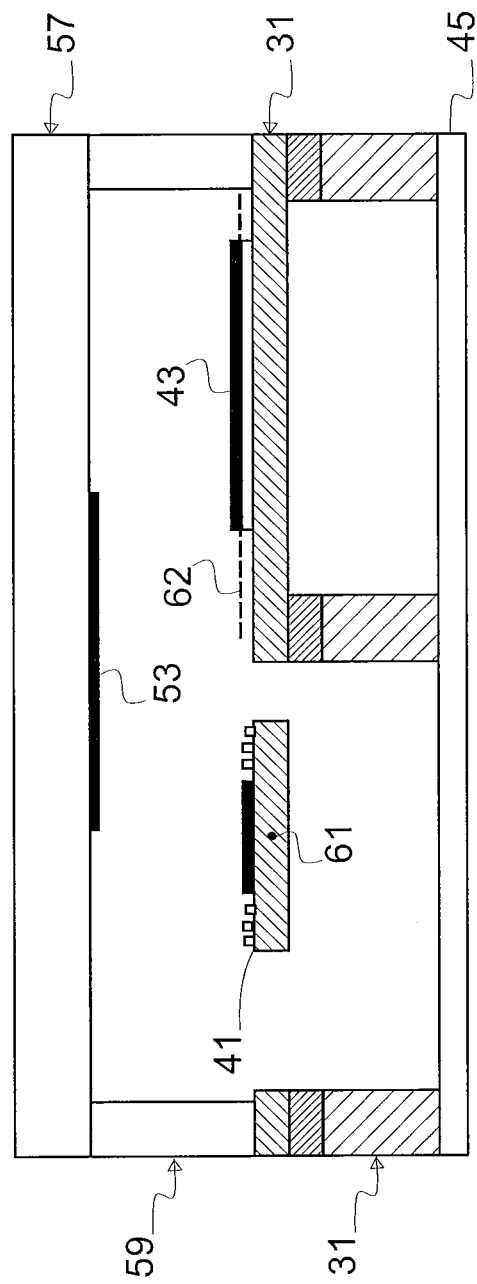

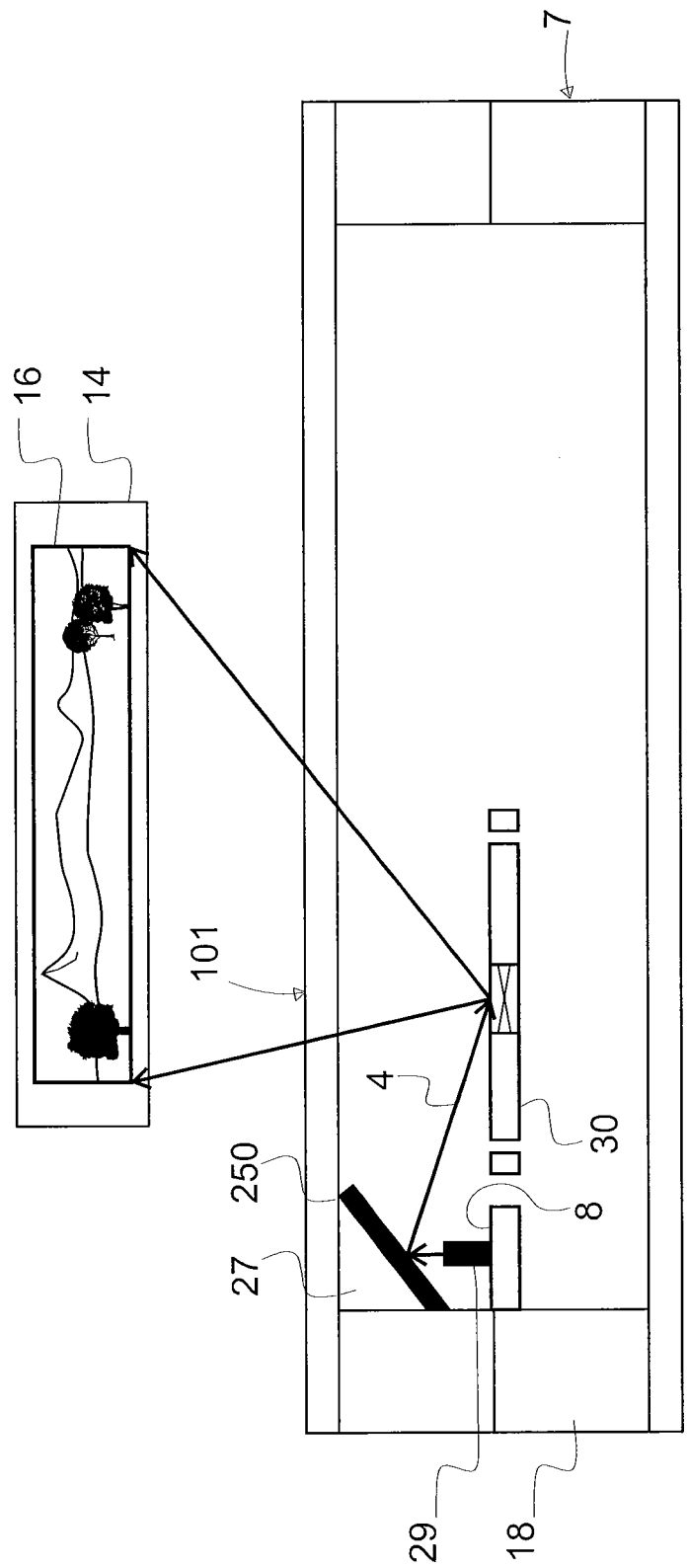

MEMS MICRO-MIRROR DEVICE

RELATED APPLICATION

This application is a Continuation of PCT/EP2010/059386, filed Jul. 1, 2012, the subject matter of which is incorporated herein by reference in its entirety.

FIELD OF THE INVENTION

The present invention concerns a MEMS micro-mirror device, in particular, but not exclusively, a MEMS micro-mirror device which is suitable for use in a projection system. The present invention also relates to a method for manufacturing such a device and a method of projecting an image onto a display screen.

DESCRIPTION OF RELATED ART

A MEMS micro-mirror device is a device that contains an optical MEMS (Micro-Electrical-Mechanical-System). The optical MEMS may comprise a cylindrical, rectangular or square micro-mirror that is adapted to move and to deflect light over time. The micro-mirror is connected by suspended arms to a fixed part and can tilt and oscillate along one or two axis. For example it can oscillate vertically and horizontally. Different actuation principles can be used, including electrostatic, thermal, electro-magnetic or piezo-electric. MEMS devices are known in which the area of these micro-mirrors are around a few mm2. In this case, the dimensions of the MEMS device, comprising the packaging, is around ten mm2. This device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system.

A typical application of the MEMS micro-mirror devices is for optical scanning and projection systems. Each of these applications requires a system that is able to actuate the device and to detect the tilting angle of the micro-mirror at any time. For optical scanning applications, such as optical spectrometers and barcode scanner, the scanning operation has for example to be synchronized with the measurement system and the detection scheme.

In a projection system, a 2-D image or a video can be displayed on any type of surface. In a colour system, each pixel is generated by combining modulated red, green and blue laser light sources, by means of, for example, a beam combiner. A MEMS micro-mirror device directs the light of the laser light source to a projection surface and reproduces the image, or the video, pixel-by-pixel. By means of its oscillations, the micro-mirror within the device will continuously scan from left to right and from top to bottom, or according to a different trajectory including e.g., Lissajou trajectories, so that each pixel of the 2-D image is displayed on the screen.

Typically, the micro-mirror of a MEMS micro-mirror device is able to oscillate along one axis. Therefore, in order to display a 2-D image on a screen a projection system will require two MEMS micro-mirror devices; a first MEMS micro-mirror device is required to deflect light along the horizontal and a second MEMS micro-mirror device is required to deflect light along the vertical. During operation, the micro-mirror of the first MEMS micro-mirror device receives light from the beam combiner and deflects the light to the micro-mirror of the second MEMS micro-mirror device. The micro-mirror of the second MEMS micro-mirror device will in turn deflect the light to the display screen where it will appear as a pixel. The micro-mirror of the first MEMS micro-mirror device will oscillate to scan the light along the horizontal thereby displaying the first row of pixels on the display screen. The micro-mirror of the second MEMS micro-mirror device will oscillate about its oscillatory axis so that light received from the micro-mirror of the first MEMS micro-mirror device is scanned along the vertical. The combined effect of the oscillating micro-mirrors is that the light from the beam combiner is scanned in a zig-zag pattern along the display screen. The process is continuous so that a complete image is visible to the viewer on the display screen. The first and the second MEMS micro-mirror devices must be precisely positioned such that the oscillatory axes of their respective micro-mirrors are orthogonal, otherwise all the light received by the micro-mirror of the first MEMS micro-mirror device will not be deflected to the micro-mirror of the second MEMS micro-mirror device as the micro mirrors oscillate. Accordingly, if precise positioning of the two MEMS micro-mirror devices is not achieved, at least part of the 2-D image will not be displayed on the display screen, or undesired geometric deformations will be generated. Precise positioning of encapsulated MEMS micro-mirror devices is very difficult to achieve. Furthermore, the difficulty in attaining precise positioning of two MEMS micro-mirror devices is further compounded by the fact that the external dimensions and shape of the plastic or ceramic packages in which the MEMES devices are housed vary from batch to batch.

Other MEMS micro-mirror devices comprise a micro-mirror which can oscillate along two orthogonal axes. Such a micro-mirror can scan the light beam in two dimensions. Therefore, to display a 2-D image on a display screen a projection system will require only one such MEMS micro-mirror device.

Various methods of oscillating the micro-mirrors are employed. For example, a electrostatic means; thermal means; electro-magnetic means, or piezo-electric means. Accurate control of the oscillating movements of the micro-mirrors has proven difficult in the past; for example, the accurate control of oscillation of the micro-mirrors by electro-magnetic means has not been possible due to varying magnetic field strengths along an electrical coil used to generate the magnetic field which imparts an oscillating movement on the mirrors.

A further problem with existing MEMS micro-mirror devices is that light from the laser source (e.g., beam combiner) must be transmitted to the micro-mirror within the device through a front end of the MEMS micro-mirror device; take for example an existing MEMS micro-mirror devices which comprises a micro-mirror which can oscillate along two orthogonal axes; light from a laser source, such as a beam combiner, must be transmitted to the micro-mirror within the device through a front end of the MEMS micro-mirror device. The light is received directly by the micro-mirror. As the micro-mirror oscillates along its two orthogonal oscillation axes a 2D image is projected onto the projection screen. Disadvantageously, since the light laser source must be transmitted to the micro-mirror within the device through a front end of the MEMS micro-mirror device, parasitic light coming from the laser source will interfere with the light being projected out of the MEMS micro-mirror device towards the display screen. The parasitic light impacts on the projected light to compromise the quality of the 2D image visible on the display screen.

It is an aim of the present invention to obviate or mitigate one or more of the aforementioned disadvantages.

BRIEF SUMMARY OF THE INVENTION

According to the present invention there is provided, a MEMS micro-mirror device comprising, a single package; a first minor and second mirror, wherein at least one of the mirrors is configured to oscillate along an oscillation axis; wherein both minors are located within the single package and are arranged such that as the at least one mirror oscillates, the light incident on the first micro-mirror can be deflected to the second minor.

A minor is any which is capable of reflecting light. For example, the term 'mirror' includes, but is not limited to, a reflecting means, micro-mirror, a reflective element such as a metallic element, a reflective surface such as a metallic surface.

Preferably, both mirrors are arranged such that as the at least one minor oscillates, all the light incident on the first micro-mirror can be deflected to the second minor.

The first mirror may be configured such that it can oscillate along a first oscillation axis, and the second minor may be configured such that it can oscillate along a second oscillation axis.

The second oscillation axis may be orthogonal to the first oscillation axis. This may ensure that all light incident on the first micro-mirror can be deflected to the second mirror as both micro-mirrors oscillate about their respective axes.

As discussed above, in a projection device which uses two MEMS micro-mirror devices each with a micro-mirror which oscillates along one oscillation axis, the position of one MEMS micro-mirror device with respect to the other is critical to enable projection of a 2-D image. For projection of a 2-D image the micro-mirror of one MEMS micro-mirror device must be precisely positioned such that its oscillation axis is exactly orthogonal to the oscillation axis of the micro-mirror of the other MEMS micro-mirror device.

Advantageously, since the MEMS micro-mirror device of the present invention comprises two mirrors, at least one of which can oscillate about an oscillation axis, are pre-arranged within the same single package so that as the at least one minor oscillates, the light incident on the first micro-mirror can be deflected to the second mirror, the user is not required to precisely position two MEMS micro-mirror devices to enable the projection of a 2-D image; positioning of the minors is made at manufacture of the MEMS micro-mirror device and only depends on the manufacturing process.

In a further embodiment at least one of the first or second minors is configured to oscillate along two orthogonal axes. This will enable the at least one minor to scan light in two dimensions (i.e., horizontally and vertically). Preferably, the first minor is fixed and the second minor is configured to oscillate along two orthogonal axes.

Advantageously, in this particular embodiment since the second minor scans light in two directions (horizontally and vertically), this obviates the need for a second oscillating minor to enable projection of a 2-D image. However, to ensure projection of an uncompromised 2-D image all the light received by the first minor must be deflected to the second mirror; for this to occur the minors must be correctly and accurately aligned. As with the first embodiment since the first and second minors are pre-arranged within the same single package so that as the second mirror oscillates, the light incident on the first micro-mirror can be deflected to the second minor, the user is not required to precisely position mirrors, or two or more MEMS micro-mirror devices, to enable the projection of a 2-D image; positioning of the first and second minors is made at manufacture of the MEMS micro-mirror device and only depends on the manufacturing process.

A further advantage associated with the provision of two minors within a single package is that deflection of light within the MEMS micro-mirror device can be achieved. Because light can be deflected within the MEMS micro-mirror device the device is capable of receiving light from a laser source which is positioned at the rear end of the MEMS micro-mirror device and project an image from the front end of the MEMS micro-mirror device. For example, laser sources, coupled with a beam combiner which are used to generate the individual pixels of the image, can be located at the rear end of the MEMS micro-mirror device and can be arranged to transmit light through the rear of the MEMS micro-mirror device; light transmitted through the rear of the MEMS micro-mirror device is received by the first minor and deflected within MEMS micro-mirror device the towards the second mirror so that the second minor projects the light through the front end of the MEMS micro-mirror device and onto the projection screen. The provision of two minors within the single package allows deflection of light within the device; without the provision of a second minor the beam combiner would need to be positioned at the front end of the MEMS micro-mirror device so that the single mirror could receive the light directly from the beam combiner and reflect the light towards the projection screen and display the 2D image. In this case parasitic light coming from the bean combiner and/or from an interface between the air and glass of the single package, would interfere with the light projected out of the MEMS micro-mirror device to compromise the quality of the 2D image visible on the screen. Advantageously, in the present invention, since light can be transmitted through the rear of the MEMS micro-mirror device, the parasitic light of the air-glass interface cannot impact on the light projected out of the front end of the MEMS micro-mirror device; thus the present invention allows a clearer image to be projected on to the projection screen.

The area within the single package may be a vacuum. The area within the single package may comprise a specific gas which enables increased mechanical, optical and/or long term reliabilities performances. For example, the area within the single package may comprise Argon. The provision of Argon within the single package will facilitate reliability in case of a laser chip being located within the package.

The single package may comprise one or more portions which is/are transparent to light, to allow light to enter the single package. The one or more portions which is/are transparent to light, may also allow light to exit the single package. For example, the single pack may comprise one or more transparent windows. Preferably, a portion of the single package which is transparent to light is arranged to allow light to exit a front end of the single package. Preferably, a portion of the single package which is transparent to light is arranged to allow light to enter the single package from a rear end of single package. This will enable a mirror within the single package to receive light from an external laser source located at the rear of the MEMS micro-mirror device, thus mitigating the problems associated with parasitic light from the laser source. For example, a beam combiner used to generate the individual pixels of the image can be located to the rear and still transmit light to a mirror within the single package, since the beam combiner is located at the rear of the single package light transmitted by the beam combiner will not interfere with the light projected out of the front end single package.

Preferably, the geometrical characteristics of the external laser source and optics (e.g., beam combiner) may be adapted in dimensions and geometrical orientation with the MEMS micro-mirror device to facilitate the assembly and the alignment of MEMS micro-mirror device and laser source.

The single package may comprise a ceramic component. For example the single package may comprise a ceramic housing. Advantageously, a ceramic package will reduce, or prevent, parasitic light reflection which occur within the MEMS micro-mirror device. The single pack could be a 'chip package' or a housing in which a chip can be housed to enable the chip to be electrically and mechanically connected to a printed circuit board. For example the chip package could enable the chip to be connected to the circuit board by means of plugging into (socket mount), or soldering onto (surface mount), the printed circuit board. The chip package or housing may be provided with metal leads, or "pins", which are sturdy enough to electrically and mechanically connect the chip to the printed circuit board.

The single package of the MEMS micro-mirror device may comprise a cap member. The single package of the MEMS micro-mirror device may further comprise a base member. The cap member, base member, and a wafer in which a mirror is formed, may define the single package in which the first and second minors are located. The cap member may be positioned such that the cap member, base member, and a wafer in which a mirror is formed, define the single package in which the first and second minors are located. The base member may define the rear end of the MEMS micro-mirror device and the cap member may define the front end of the MEMS micro-mirror device.

The base member may be configured such that a minor located within the single packet can receive light from an external light source. This will enable a mirror within the single packet to receive light from an external laser source located at the rear of the MEMS micro-mirror device, thus mitigating the problems associated with parasitic light from the laser source and the optical interfaces. For example, a beam combiner used to generate the individual pixels of the image can be located to the rear of the MEMS micro-mirror device so that light transmitted through the beam combiner will not interfere with the light projected out of the front end of the MEMS micro-mirror device. The base member may comprise a transparent window. The base member comprises a transparent glass sheet.

The cap member may be configured such that a mirror within the single package can project light through the cap member towards the projection screen. This will enable light to be projected out of the front end of the MEMS micro-mirror device towards a projection screen. Furthermore, it makes it possible for a mirror within the package to receive light from an external light source located at the front end the MEMS micro-mirror device. For example, the minor will be able to receive light from a laser source such as a beam combiner which is located outside and at the front end of the MEMS micro-mirror device. The cap member may comprise a transparent window. The cap member may comprise a transparent glass sheet.

The cap member may further comprise a spacer wafer.

The spacer wafer may further comprise a tapered edge.

At least one of the first or second mirrors may be larger than the other. For example, the second minor may be larger than the first minor. For example, in the case of the embodiment of the MEMS micro minor device in which the first mirror is configured such that it can oscillate along a first oscillation axis, and the second minor is configured such that it can oscillate along a second oscillation axis, the second mirror may be larger than the first minor.

The MEMS micro-mirror device may further comprise one or more reflecting means. A reflecting means is any means which is capable of reflecting light, and includes, but is not limited to, mirrors, micro-mirrors, a reflective element such as a metallic element, a reflective surface such as a metallic surface. The or each reflecting means may take any suitable form, shape, aspect or design. The one or more reflecting means may be provided in addition to the first and second mirrors. The or each reflecting means may be capable of facilitating the deflection of light within the single package. The or each reflecting means may be capable of deflecting light within the single package. For example, the MEMS micro-mirror device may further comprise a third minor which can displace the projected image. The MEMS micro-mirror device may comprise a reflecting means arranged such that it can deflect light from the first minor to the second mirror. The MEMS micro-mirror device may comprise a reflecting means which is arranged such that it can deflect light from a light source to a minor. For example, the reflecting means may be arranged such that it can deflect light from a laser diode chip to the first mirror. It will be understood that the MEMS micro-mirror device may comprise any number of reflective means. It will be further understood that the or each reflective means can be arranged in any manner within single package to deflect light within the single package along any desired path.

A reflecting means may be provided on the cap member. For example, at least one reflective means located on an inner side of the cap member. A reflecting means may be integral to the cap member. For example, a reflecting means may be made integral to the cap member means of metallization of the cap member. A reflecting means may be secured to the tapered edge of the spacer wafer of the cap member The MEMS micro-mirror device may further comprise one or more laser sources. Preferably, a laser source is positioned within the single package. The integration of a laser source in a MEMS package could also be considered for all embodiments of the present invention including a MEMS device having one single 1D or 2D mirror, or any number of micro-mirrors. Preferably, the laser source is a laser diode chip. The laser source may be arranged within the single package such that all light from the laser source is directed to a minor or reflective means within the single package.

The MEMS micro-mirror device may further comprise electronics suitable for operating the laser source. For example, the MEMS micro-mirror device may comprise electronics suitable for operating a laser diode chip. Preferably, said electronics are located within the single package.

The MEMS micro-mirror device may further comprise electronics suitable for implementing oscillation of a mirror about an oscillation axis. Preferably, said electronics are located within the single package.

The or each mirror may be oscillated about its respective oscillation axes by at least one means selected from a group comprising of; a electrostatic means; thermal means; electromagnetic means, or piezo-electric means.

The MEMS micro-mirror device may further comprise one or more optical lens.

The MEMS micro-mirror device may further comprise one or more active lens.

The MEMS micro-mirror device may further comprise one or more colour filters.

The MEMS micro-mirror device may further comprise one or more magnetic elements. The or each magnetic element may be arranged to provide a magnetic field in the region of a mirror located within the single package. Providing a magnetic field in the region of the mirrors facilitates oscillation of the minors about their respective oscillation axes by an electro-magnetic means. Preferably, the magnetic element is a permanent magnet. The or each magnetic element may be positioned on an outer surface of the single package. Positioning the or each magnetic element in this manner will facilitate vacuum encapsulation of the minors within the single package.

A magnetic element may further comprise an aperture. Advantageously, the aperture will homogenise the magnetic field along a MEMS electrical coil of an electro-magnetic means used to oscillate the MEMS mirrors about their respective oscillation axis. Thus, the aperture will facilitate accurate control of the oscillations of the minors about their respective axes.

According to the present invention there is further provided, a MEMS micro-mirror device comprising, a single package; at least one minor configured such that it can oscillate along an oscillation axis; and at least one laser source, wherein, both the at least one mirror and the at least one laser source are located within the single package.

According to the present invention there is further provided a projection device comprising MEMS micro-mirror device according to any of the above-mentioned embodiments. The projection device may be a mobile phone.

According to a further aspect of the present invention there is provided, A method of projecting a image onto a projection screen using a MEMS micro-mirror device comprising a front end which has at least a portion which is transparent to light, and a rear end, which is an end opposite the front end, which has at least a portion which is transparent to light, the method comprising the steps of, receiving light from a laser through the rear end of the MEMS micro-mirror device, deflecting light within the MEMS micro-mirror device, projecting the deflected light through the front end of the MEMS micro-mirror device to a projection screen.

According to a further aspect of the present invention there is provided a method of manufacturing a MEMS micro-mirror device comprising the steps of, arranging a first minor and second minor within a single package, such that at least one of the mirrors is configured to oscillate along an oscillation axis and such that as the at least one mirror oscillates along the oscillation axis, the light incident on the first mirror can be deflected to the second mirror.

Preferably, the first minor and second mirror are arranged such that all light incident on the first mirror can be deflected to the second mirror.

The method may further comprise the steps of, arranging a first minor in a single package such that the first micro mirror can oscillate along a first oscillation axis; arranging a second minor in the same single package, such that the second micromirror can oscillate along a second oscillation axis.

Preferably, the first and second minors are arranged such that the second oscillation axis is orthogonal to the first oscillation axis, so that as both micro-mirrors oscillate about their respective axes, all the light incident on the first micro-mirror can be deflected to the second minor.

The method may comprise the step of arranging least one of the first or second minors in the single package such that it can oscillate about two orthogonal axis of oscillation.

Preferably, the method of manufacturing a MEMS micromirror device may comprise the steps of, arranging at least one of the first or second mirrors in a single package such that it can oscillate about two orthogonal axis; and arranging the other mirror in the same single package such that all light incident on the other minor can be deflected to the mirror arranged to oscillate as it oscillates about its two orthogonal axis.

The method of manufacturing a MEMS micro-mirror device may comprise the step of fixing the position of other mirror within the single package.

The method of manufacturing a MEMS micro-mirror device may comprise the of providing one or more transparent windows in the single package which enable light to enter the single package. Preferably, the method comprises the step of providing a transparent window in a rear end of the single package. Preferably, the method comprises the step of providing a transparent window in a front end of the single package.

The method may further comprise the step of, providing one or more reflective means which is/are capable of deflecting light within the single package. Preferably, the method comprises the step of, providing one or more reflective means within the single package, which is/are capable of deflecting light within the single package. Preferably, the method comprises the step of, providing a reflective means within the single package which is capable of facilitating the deflection of light, within the single package, from the first minor to the second minor.

The method may further comprise the step of arranging a light source within the single package. Preferably, the method comprises the step of arranging a laser chip within the single package on a surface of a silicon wafer. Preferably, the method may comprise the step of electrically connecting the light source to the silicon wafer. The light source may be glued to the silicon wafer. Preferably, the light source is be glued to the silicon wafer using a thermally conductive glue. The light source may be a laser chip. The light source may be a LED.

The method may further comprise the step of applying one or more magnetic elements to the single package. Preferably, the method comprises the step of applying one or more magnetic elements to an outer surface of the single package.

The method may further comprise the step of forming an aperture in a magnetic element.

The method may further comprise the steps of, depositing a metal on a surface of a silicon wafer and/or depositing a metal on a surface a layered silicon-insulator-silicon (SOI) substrate; etching the metal to define a metal platform on the surface of the silicon wafer; depositing a reflective component on the platform and on at least a portion of the surface of the wafer; etching the silicon wafer to define a first mirror and a second mirror.

The metal deposited on the surface of a silicon wafer may be Aluminum, Copper, Gold or any alloy comprising any one of these metals. The reflective component may comprise Aluminum, Titanium, Magnesium Silver or Gold or any alloy comprising any one of these metals.

The method may further comprise the step of arranging the silicon wafer on a base member. The base member may comprise a transparent glass sheet.

The method may further comprise the steps of, depositing a reflective component onto a glass sheet; etching the reflective component to define a reflective means; securing a spacer wafer to the glass sheet to form a cap member.

The metal deposited on the glass sheet may be Aluminum, Silver, Titanium, Magnesium or Gold or any alloy composed partly by these metals or other metals having high reflectivity in the visible and IR ranges. Preferably, metal, or metal alloy, deposited on the glass sheet will have a reflectivity greater than 80%. Most preferably, metal, or metal alloy, deposited on the glass sheet will have a reflectivity greater than 90%.

The method may further comprise the step of, positioning the cap member on the silicon wafer, such that the reflective means on the cap can deflect light from the first mirror to the second mirror.

The method may comprise the step of, positioning the cap member on the silicon wafer, such that the cap member, silicon wafer and base member define the single package within which the mirrors are located.

The method may further comprise the step of, securing the cap member to the silicon wafer. For example, the cap member may be secured to the wafer by means of anodic bonding, gluing, eutectic bonding, soft soldering, low-temperature direct bonding or glass frit bonding.

The method may further comprise the steps of, processing a silicon wafer to form a spacer element which has at least one tapered edge; securing the spacer element to a glass sheet; depositing metal on at least a surface of the tapered edge of the spacer element and on a surface of the glass sheet; etching the metal to define a first reflective means on the tapered edge of the spacer element, and optionally to define a second reflective means on the surface of the glass sheet, and to form a cap member.

The metal deposited on at least a surface of the tapered edge of the spacer element and on a surface of the glass sheet, may be Aluminum, Silver or Gold or any alloy composed partly by these metals or other metals having high reflectivity in the visible and IR ranges. Preferably, metal, or metal alloy, deposited on at least a surface of the tapered edge of the spacer element and on a surface of the glass sheet, will have a reflectivity greater than 80%. Most preferably, metal, or metal alloy, deposited on at least a surface of the tapered edge of the spacer element and on a surface of the glass sheet, will have a reflectivity greater than 90%.

The method may further comprise the step of, positioning the cap member such that light can be deflected from the first reflective means to the first mirror, and from the first mirror to the second reflective means, and from the second reflective means to the second mirror. The cap member may be secured to the silicon wafer. For example, the cap member may be secured to the silicon wafer by means, of anodic bonding, gluing, eutectic or glass frit bonding.

THE BRIEF DESCRIPTION OF THE DRAWINGS

An embodiment of the invention will now be described by way of example only, with reference to the accompanying drawings in which, FIG. 1 provides a cross-sectional view of a MEMS micro-mirror device according to a first embodiment of the present invention;

FIG. 2 provides a cross-sectional view of a MEMS micro-mirror device according to a second embodiment of the present invention;

FIG. 3 provides a cross-sectional view of a MEMS micro-mirror device according to a third embodiment of the present invention;

FIGS. 4a(i)-4d illustrate the steps involved in a method of manufacturing a MEMS micro-mirror device; with FIG. 4a(ii) providing a plan view of the wafer of FIG. 4a(i);

Figure 7:
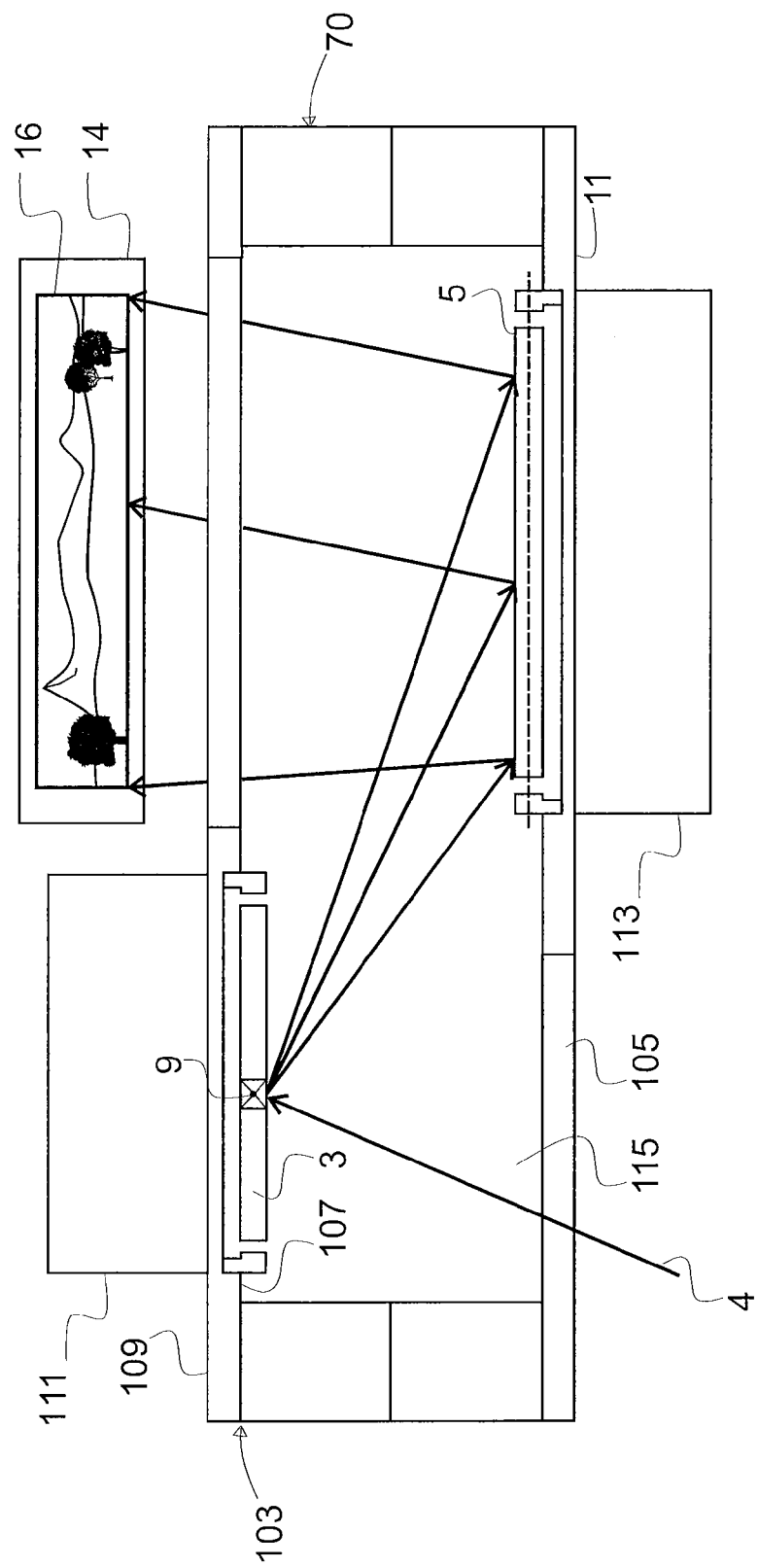
Figure 8:
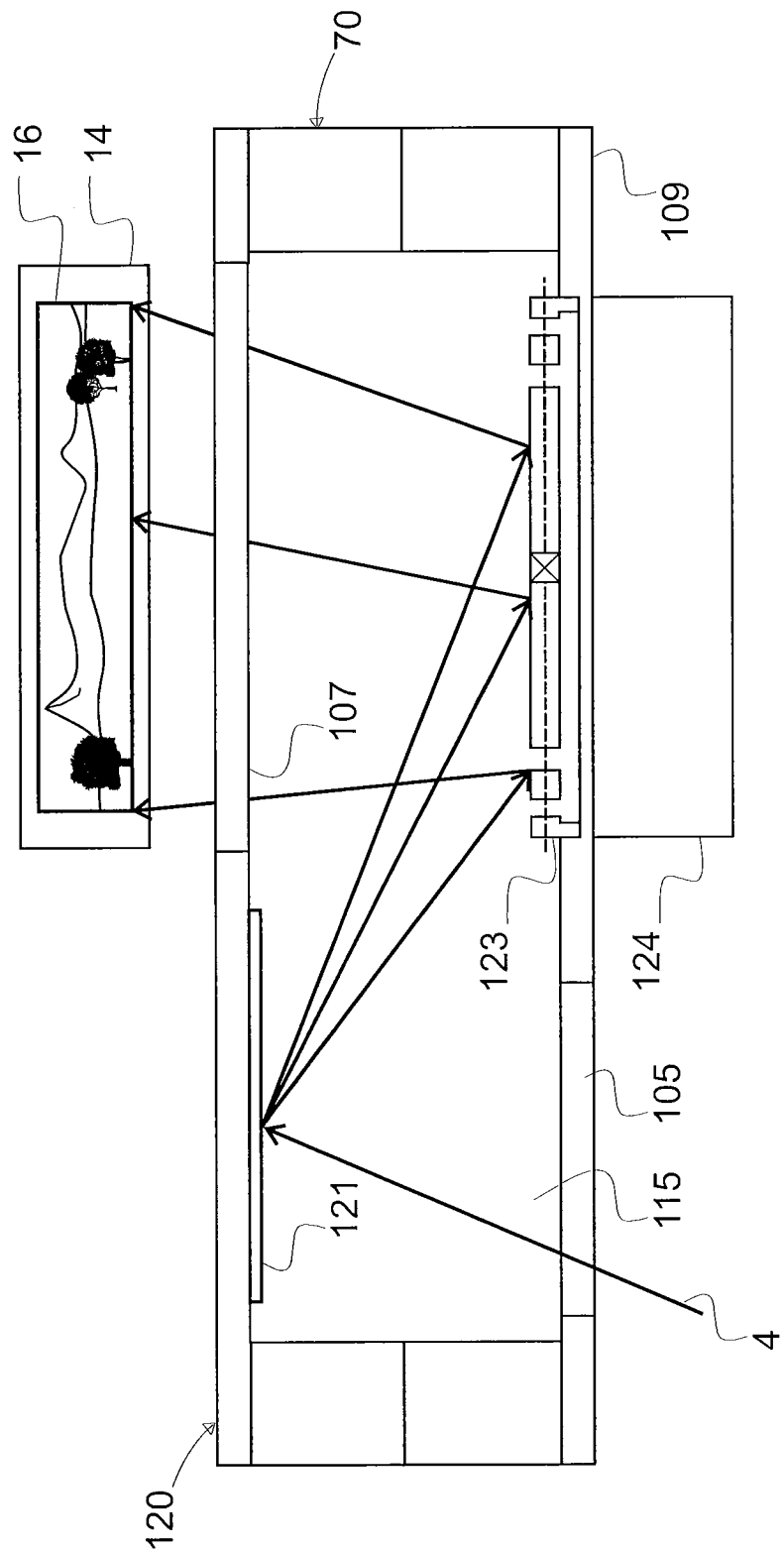
Figure 9A:
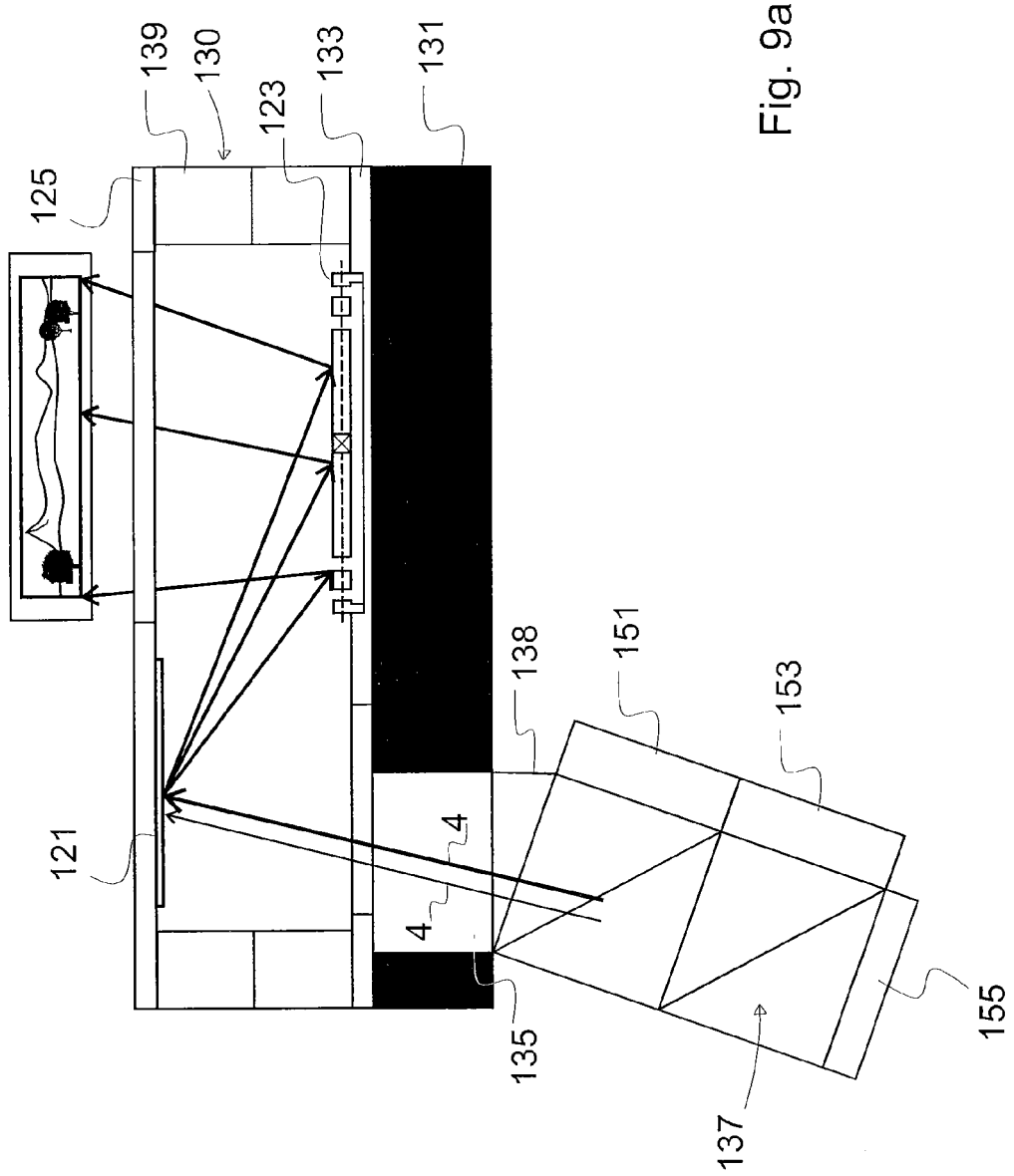
Figure 9B:
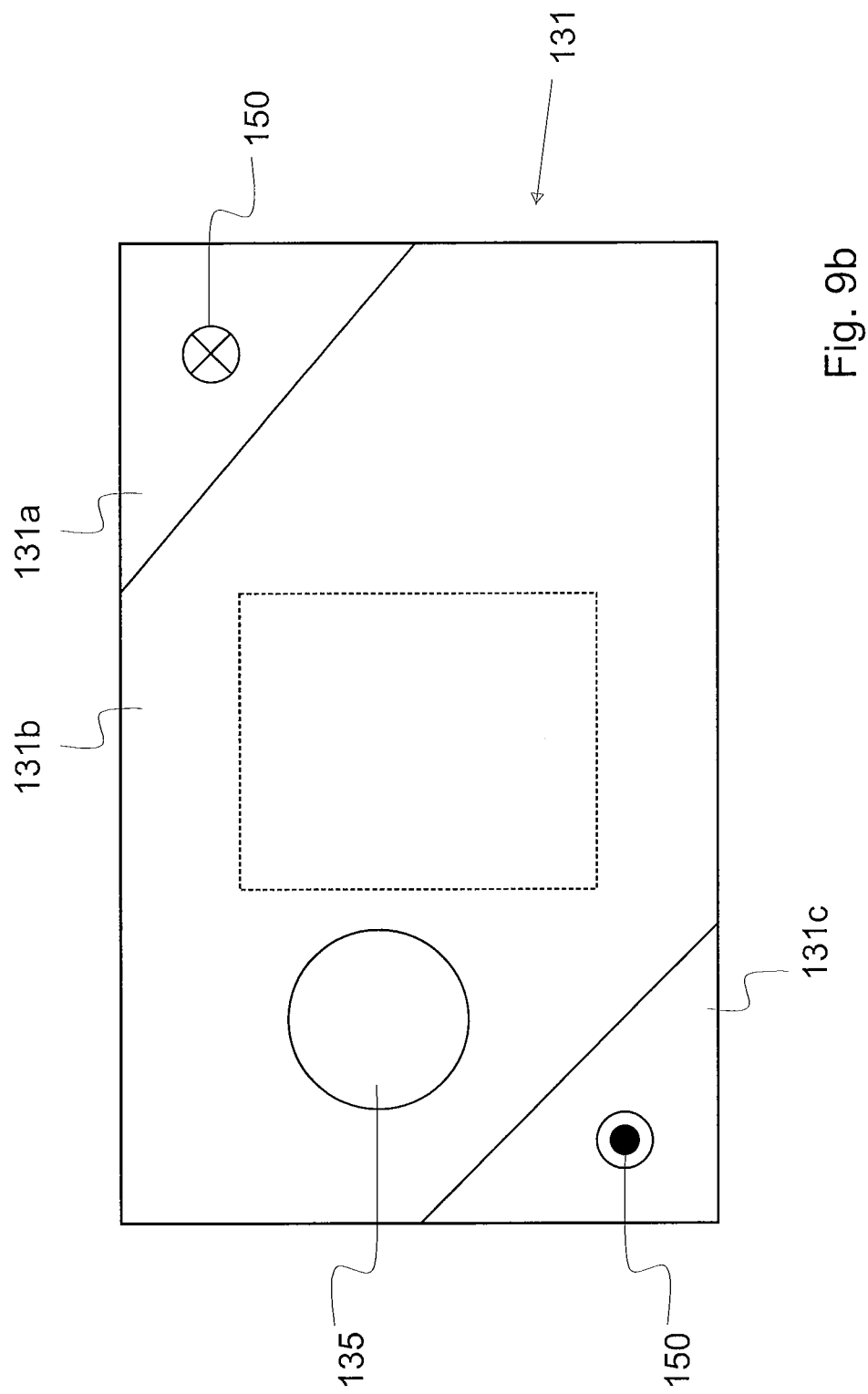

FIG. 7 provides a cross-sectional view of a further embodiment of the MEMS micro-mirror device according to the present invention;

FIG. 8 provides a cross-sectional view of a further embodiment of the MEMS micro-mirror device according to the present invention;

FIG. 9a provides a cross-sectional view of a further embodiment of the present invention which is a variant of the MEMS micro-mirror device illustrated in FIG. 8;

FIG. 9b provides a plan view of the permanent magnet 131 as used in the device shown in FIG. 9a; and FIG. 10 provides a cross-sectional view of a further embodiment of the MEMS micro-mirror device according to the present invention.

DETAILED DESCRIPTION OF POSSIBLE EMBODIMENTS OF THE INVENTION

Figure 1:
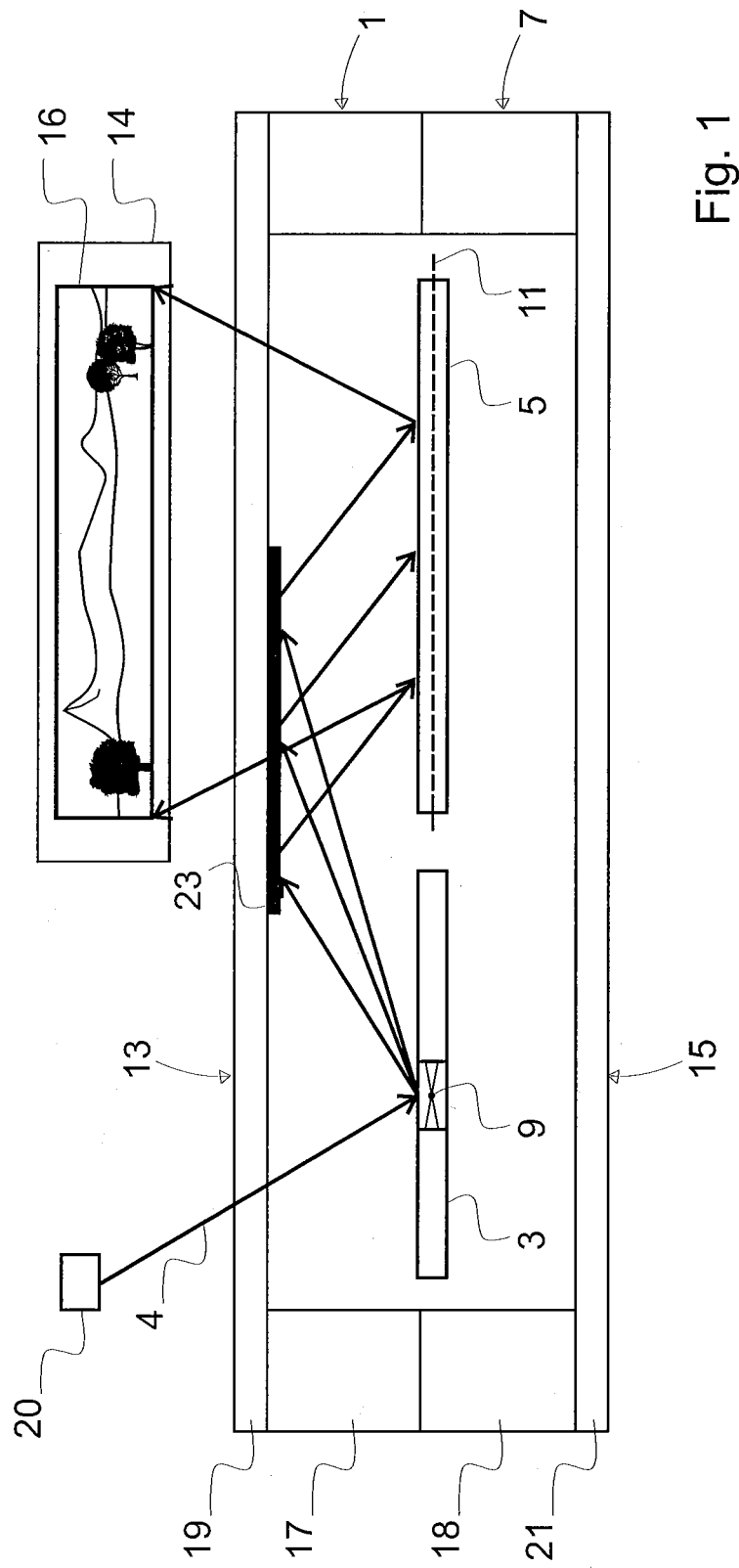

FIG. 1 provides a cross sectional view of a MEMS micro-mirror device 1 according to a first embodiment of the present invention.

The device 1 comprises a first micro-mirror 3 and a second micro-mirror 5 formed in a silicon wafer 18. As is evident from the Figure, the second micro-mirror 5 is larger than the first micro-mirror 3.

The first micro-mirror 3 can be oscillated along a first oscillation axis 9 by means of an electrostatic, electromagnetic, piezo-electric or thermal actuation (not shown). The second micro-mirror 5 can be oscillated along a second oscillation axis 11 by means of a second electrostatic, electromagnetic, piezo-electric or thermal actuation (not shown). As illustrated in FIG. 1, the second oscillation axis 11 is orthogonal to the first oscillation axis 9.

The device 1 comprises a cap member 13 and a base member 15. The cap member 13 comprises a spacer wafer 17 which is attached or bonded to a first transparent glass sheet 19. The base member 15 comprises a second transparent glass sheet 21. The cap member 13 is positioned such that the cap member 13, base member 15, and silicon wafer 18 in which first and second micro-mirrors 3,5 are formed, define a single package 7 which houses the first and second micro-mirrors 3,5.

The device 1 further comprises a reflecting means in the form of a reflective metal element 23. The reflective metal element 23 is secured to the first transparent glass sheet 19 of the cap member 13.

The device 1 can be used in a projection system to project a 2-D image 16 onto a display screen 14. The display screen 14 maybe, for example, a surface of a wall, or any other suitable surface onto which an image could be projected. During operation, each pixel of the 2-D image 16 is generated in a beam combiner 20 by combining modulated red, green and blue laser light sources. Light 4 passes from a beam combiner 20, through the first transparent glass sheet 19 and is incident on the first micro-mirror 3. Light 4 incident on the first micro-mirror 3 is deflected to the reflective metal element 23. From there the reflective metal element 23 deflects the light 4 to the second micro-mirror 5. Subsequently, the second micro-mirror 5 projects the light 4, out of the device 1, though the first transparent glass sheet 19 and onto a display screen 14 where the light 4 forms a pixel of the 2-D image 16. Each pixel of the 2-D image 16 is transmitted by the beam combiner 20 and projected to the display screen 14 in this manner.

To display the full 2D image 16 on the display screen 14, the first micro-mirror 3 oscillates about the first oscillation axis 9 to continuously scan the light 4 from the beam combiner 20 from along the horizontal, the second micro-mirror 5 simultaneously oscillates about the second oscillation axis 11 causing the light 4 to be scanned along the vertical. The combined effect of the oscillating micro-mirrors 3,5 is to scan the light 4 in a zig-zag path across the display screen 14 to project a complete 2-D image, pixel-by-pixel, onto the display screen 14. The speed of oscillation of the micro-mirrors 3,5 is such that, to the viewer, it will appear that the pixels of the 2D image 16 are simultaneously projected onto the display screen 14. The oscillation of the micro-mirrors 3,5 is continuously repeated so that a complete 2D image 16 is visible to the viewer on the display screen 14. Therefore, the user will see a complete 2D image 16 on the display screen 14. Other scanning patterns, including Lissajou curves, can also be used for scanning a 2D image onto a displace screen.

Advantageously, since the MEMS micro-mirror device 1 comprises two micro-mirrors 3,5 in the same single package, and the axes of oscillation of the micro-mirrors 3,5 are orthogonal to each other, this obviates the need for precise manual alignment of two individual MEMS micro-mirror devices to enable 2D deflection of light 4 and projection of a 2D image; positioning is made at manufacture of the MEMS package and only depends on the manufacturing process. Using the present invention all the light 4 incident on the first micro-mirror 3 is reliably reflected to the second micro-mirror 5. Accordingly, using the present invention, the reliability of a projection system to project a complete 2-D image on the display screen is improved.

Figure 2:
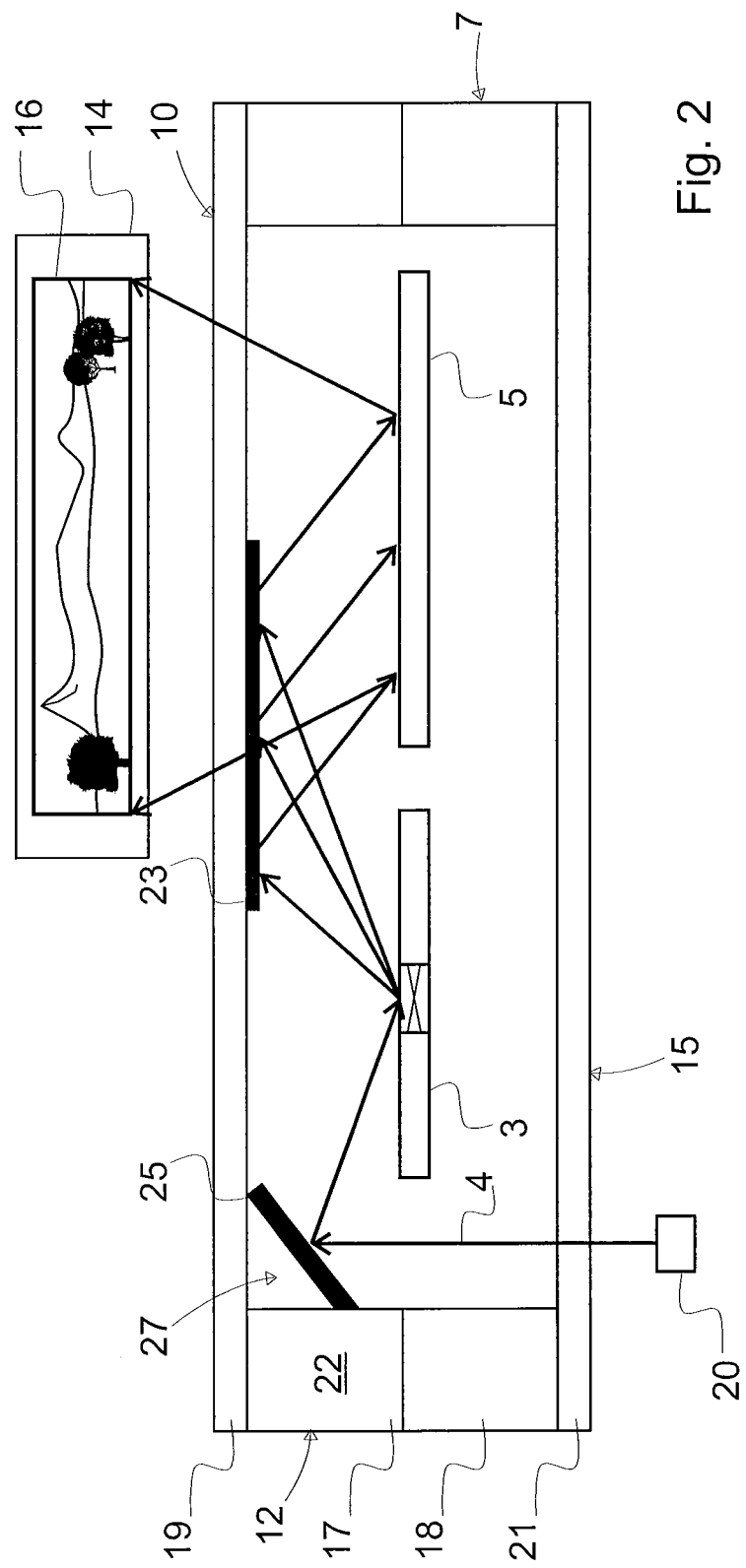

FIG. 2 provides a cross sectional view of a MEMS micro-mirror device 10, according to a second embodiment of the present invention. Many of the features shown of the first embodiment are shown in FIG. 2 and like features are awarded the same reference numerals.

The MEMS micro-mirror device 10 comprises a cap member 12. The cap member 12 comprises a spacer wafer 22 which has a tapered edge 27. A second reflecting means, in the form of a second reflective metal element 25 is deposited on the tapered edge 27.

During operation, light 4 passes from a beam combiner 20, through the transparent glass sheet 21 and is incident on the reflective metal element 25. Light 4 is deflected by the first reflective metal element 25 towards the first micro-mirror 3. Otherwise, the MEMS micro-mirror device 10 operates in a similar fashion to the device 1 shown in FIG. 1.

FIG. 3 provides a cross sectional view of a MEMS micro-mirror device 100, according to a third embodiment of the present invention. Many of the features shown of the second embodiment are shown in FIG. 3 and like features are awarded the same reference numerals.

In this embodiment, the MEMS micro-mirror device 100 further comprises a laser diode chip 29 which is secured to a surface 8 of the silicon wafer 18 within the single package 7. The laser diode chip 29 is modulated in order to generate each pixel of the 2D image 16 to be displayed. The laser diode chip 29 has typically dimensions of 300 μm*300 μm*100 μm. The light 4 generated by the laser diode chip 29 is directed to the second reflective metal element 25. The light 4 is subsequently deflected by the second reflective metal element 25 towards the first micro-mirror 5. Otherwise, the MEMS micro-mirror device 100 operates in a similar fashion to the device 1 shown in FIG. 1.

Figure 4A:
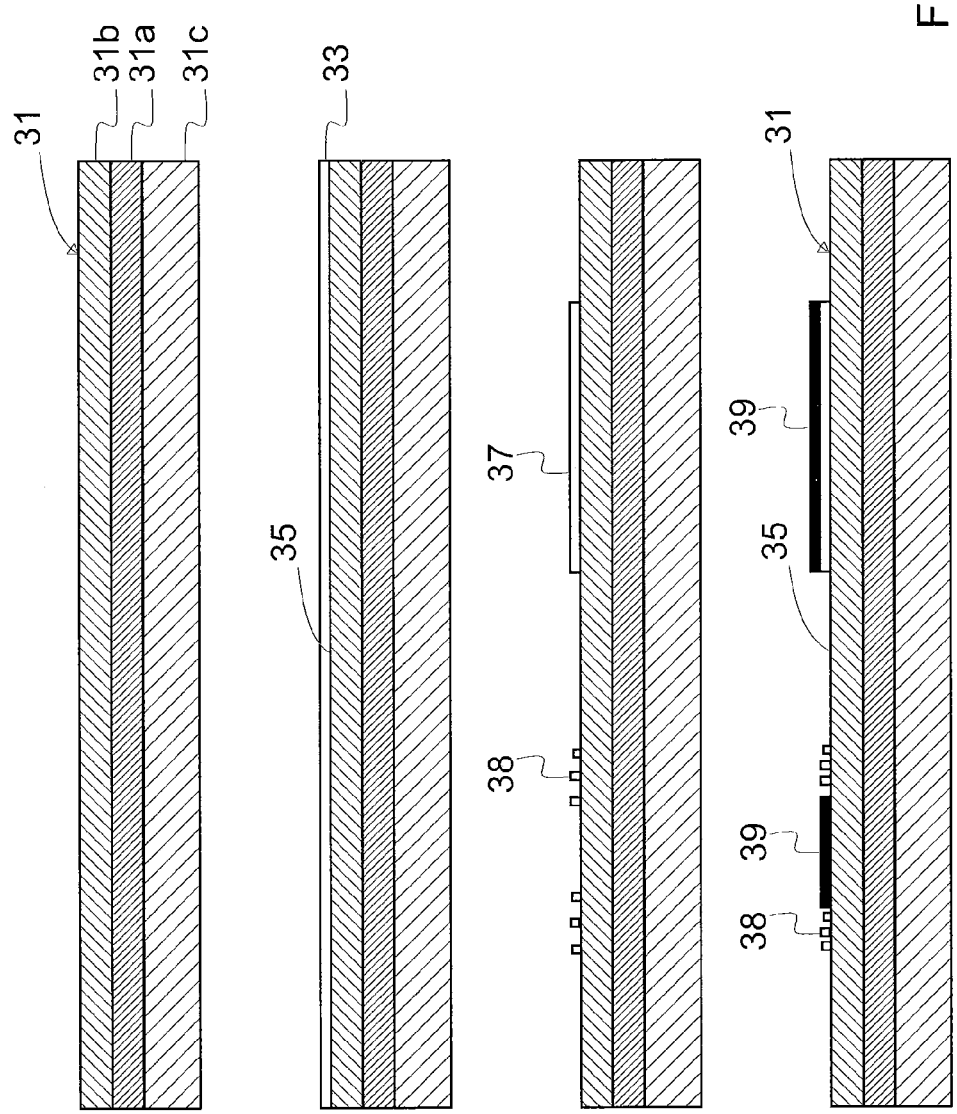

FIGS. 4a(i)-4d illustrate the steps involved in a method of manufacturing a MEMS micro-mirror device according to the second aspect of the present invention.

As illustrated in FIG. 4a(i) the method first involves providing a silicon wafer 31 comprising a silicon oxide layer 31a disposed between an first and second silicon layer 31b,31c (also known as SOI-Silicon On Insulator wafer). An Aluminum, Copper or gold layer 33 or any alloy comprising one of these metals is deposited on a surface 35 of the silicon wafer 31. The Aluminum, Copper or gold layer 33 or any alloy comprising one of these metals is subsequently etched to define a first metal coil 37 and a second, group, of metal coils 38, on the surface 35 of the silicon wafer 31. A reflective metal 39 is then deposited inside an area defined by the first metal coil 37 and reflective metal 39 is also deposited inside an area defined by the smallest of the metal coils comprised in the second, group, of metal coils 38. The reflective metal could be Silver, Gold, Titanium, Magnesium or Aluminum or any alloy comprising one of these metals.

FIG. 4a (ii) provide a plan view of the silicon wafer 31 shown in FIG. 4a(i). Most of the features illustrated in FIG. 4a(i) are also shown in FIG. 4a(ii) and like features are awarded the same reference numerals.

Figure 4B:
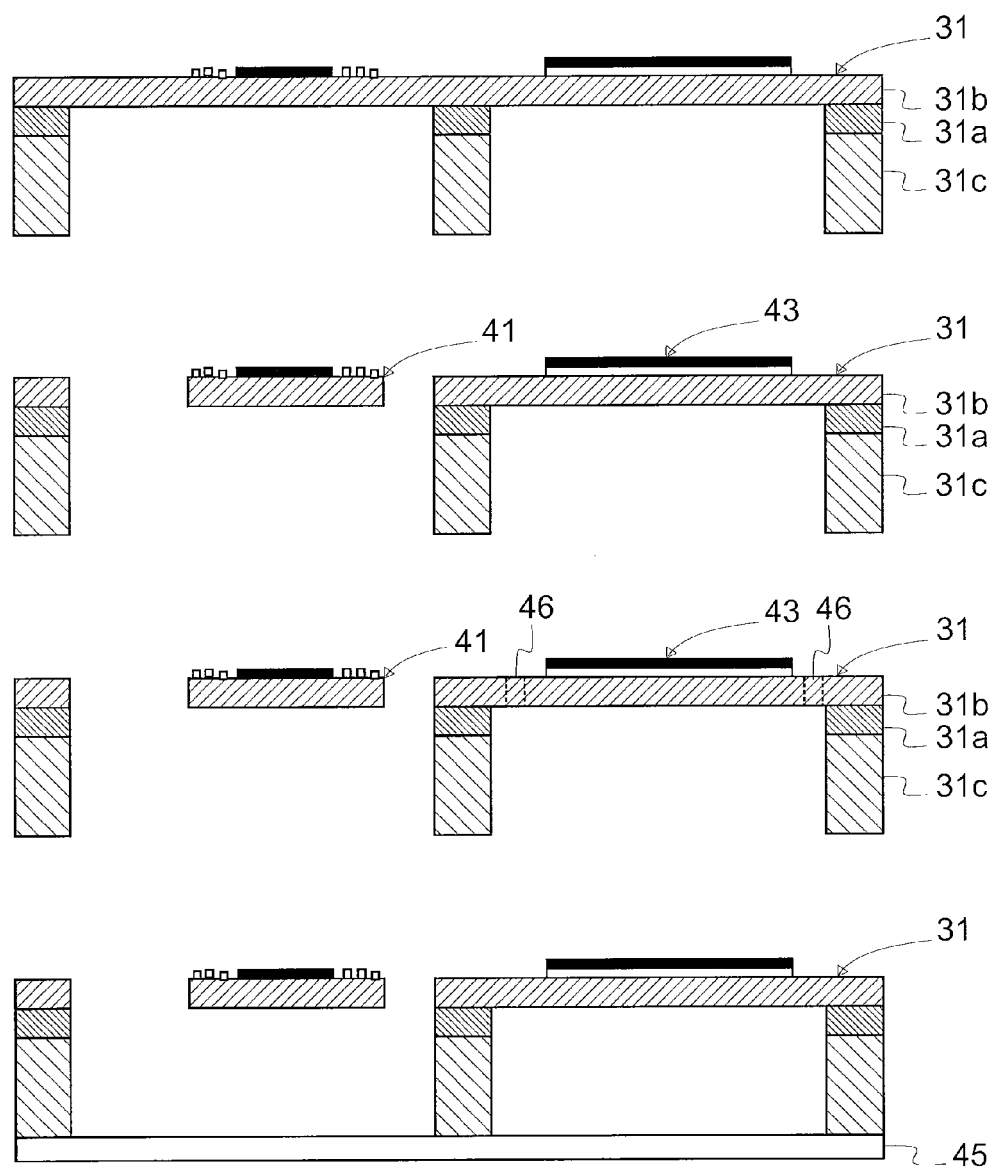

As illustrated in FIG. 4b the second silicon layer 31c and the silicon oxide layer 31a of the silicon wafer 31, are etched. Subsequently, the silicon layer 31b is etched, to define a first micro-mirror 41. The region 46 is further etched to define a second micro-mirror 43. The silicon wafer 31 is then secured to a base member in the form of a transparent or semi-transparent glass sheet 45 which provides a transparent window.

FIG. 4c illustrates the steps involved in the formation of a cap member 57. To form the cap member 57 a reflective component, in the form of a layer of metal 47, such as Aluminum, Ag, Titanium, Magnesium or Au metal or any alloy comprising at least one of these elements, is deposited onto a surface 51 of a transparent glass sheet 49. The layer of metal or alloy 47 is etched to define a reflector element 53 on the surface 51 of a transparent glass sheet 49. A spacer wafer 55 is subsequently secured to the surface 51 of the transparent glass sheet 49 to form the cap member 57.

As shown in FIG. 4d, the cap member 57 is mounted on the SOI wafer 31, such that the cap member 57, SOI wafer 31 and transparent glass sheet 45 (base member) define a single package 59 within which the first and second micro mirrors 41,43 are located. The cap member 57 is mounted such that light incident on the first micro-mirror 41 can be deflected by the reflector element 53 towards the second micro-mirror 43. The first micro-mirror 41 is arranged within the single package 59 such that it can oscillate along a first oscillation axis 61 and the second micro-mirror 43 is arranged within the single package 59 such that it can oscillate along a second oscillation axis 62, wherein the second oscillation axis 62 is orthogonal to the first oscillation axis 61.

Figure 5A:
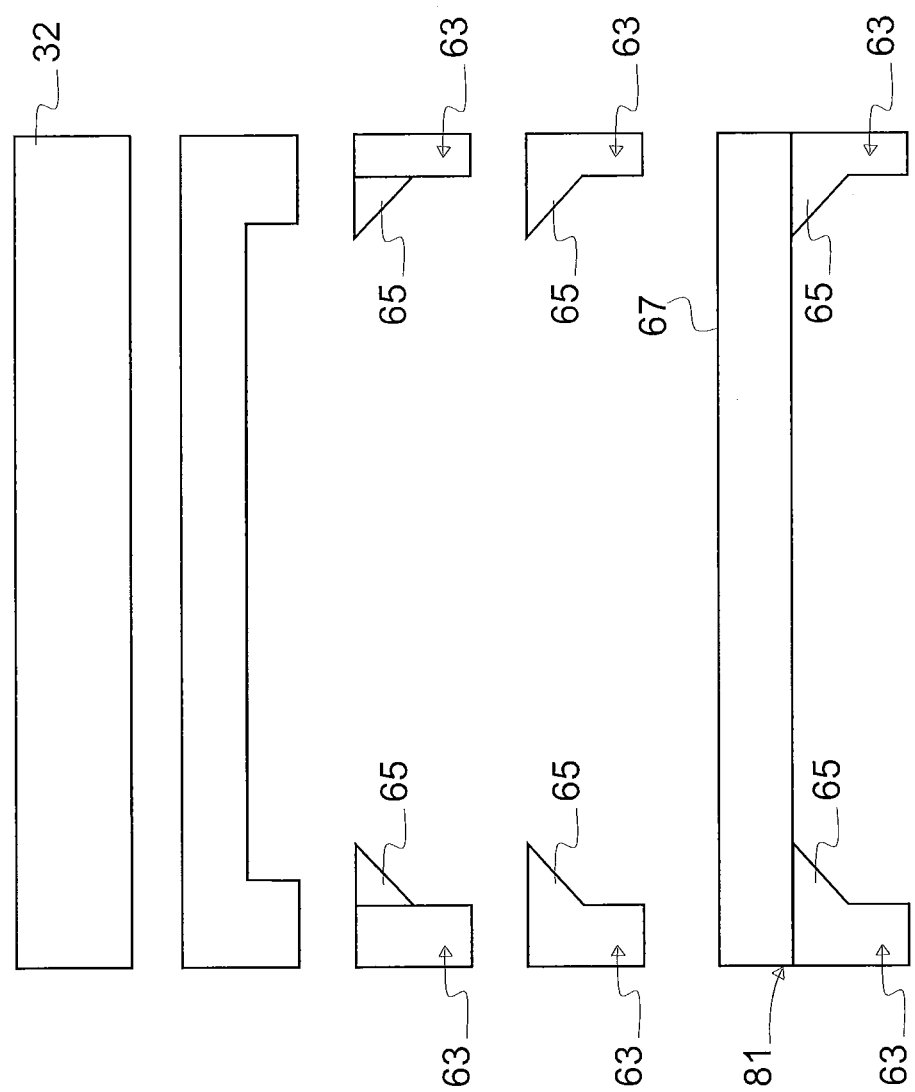
FIGS. 5a-5b illustrate an alternative step in the method of manufacturing a MEMS micro-mirror device.
Figure 5B:
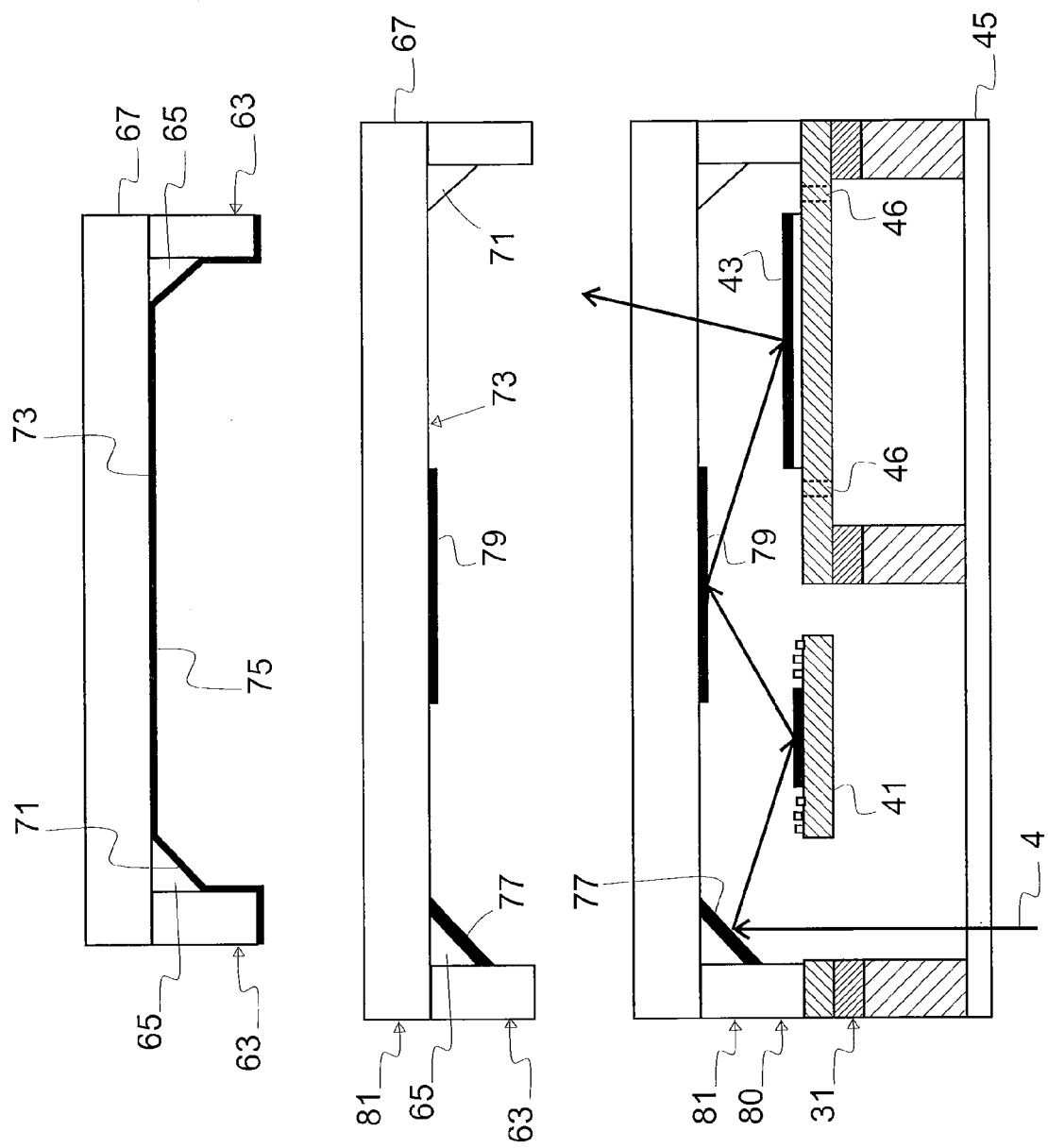

FIGS. 5a and 5b illustrate alternative steps in the method of manufacturing a MEMS micro-mirror device. Specifically, FIGS. 5a and 5b illustrate the steps involved in forming an alternative cap member 81. To form the alternative cap member 81 a silicon wafer 32 is etched (e.g., dry etch followed by a wet etch) to form a spacer element 63 with a tapered edge 65. The spacer element 63 is secured to a transparent glass sheet 67.

As illustrated in FIG. 5b, a layer of Aluminum, Gold, Magnesium, Titanium or Silver metal 75 or an alloy composed of at least one of these materials, is deposited over an inner surface 71 of the spacer element 63 and over an inner surface 73 of the transparent glass sheet 67. The layer of Aluminum, Gold, Magnesium, Titanium or Silver metal 75 is then etched to define a first reflector element 77 on the tapered edge 65 of the spacer element 63 and a second reflector element 79 on the inner surface 73 of the transparent glass sheet 67. Once etched the alternative cap member 81 is formed.

The alternative cap member 81 may be mounted on the silicon wafer 31, such that the cap member 81, silicon wafer 31 and transparent glass sheet 45 (base member) define a single package 80 within which the first and second micro mirrors 41, 43 are located (The region 46 may be etched to define the second micro-mirror 43). The alternative cap member 81 is mounted such that light can be deflected from the first reflector element 77 to the first micro-mirror 41, and from the first micro-mirror 41 to the second reflector element 79, and from the second reflector element 79 to the second micro-mirror 43.

Figure 6:
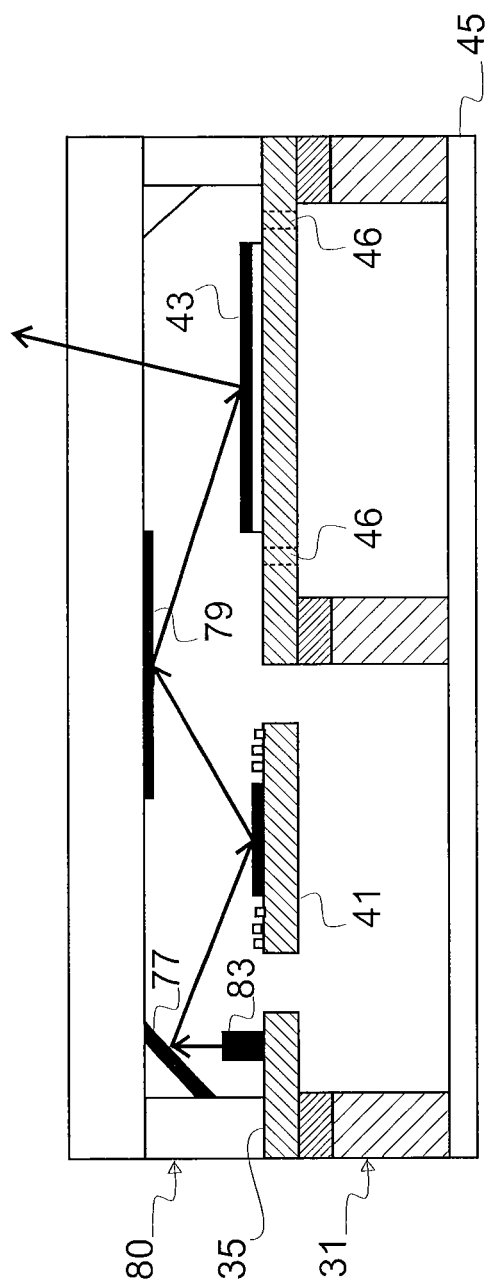
FIG. 6 illustrates a further, optional, step in the method of manufacturing a MEMS micro-mirror device.

As illustrated in FIG. 6, the method of manufacturing a MEMS micro-mirror device may further comprise the step of securing a laser chip 83 to the surface 35 of the silicon wafer 31. In the example illustrated in FIG. 6, the laser chip 83 is electrically connected to the silicon wafer 31 and is attached with glue for example to secure the laser chip 83 in position. As is evident from FIG. 6 the laser chip 83 is secured within the single package 80 such that light generated in the laser chip 83 can be incident on the first reflector element 77 and subsequently follow the same path as described above for FIG. 5b. Optionally, an additional lens can be added to the laser chip to shape the output light beam.

FIG. 7 illustrates a MEMS micro-mirror device 103 according to a further embodiment of the present invention. The MEMS micro-mirror device 103 comprises a single ceramic package 70. The region inside the single ceramic package 70 is a vacuum area 115. Alternatively, the region inside the single ceramic package 70 may not be a vacuum and may comprise instead a specific gas such as Argon. Alternately, the region inside the single ceramic package 70 may be a vacuum and may comprise a specific gas, such as Argon. The provision of Argon within the ceramic package will facilitate reliability in case of the laser chip is embedded in the package 70. The single ceramic package 70 comprises a transparent window 105; in this particular embodiment the transparent window 105 is integral to the ceramic package, however it will be understood that the transparent window could be a separate entity and applied over an aperture in the ceramic package 70.

The device 103 comprises a first micro-mirror 3 and a second micro-mirror 5 both of which are located within the single ceramic package 70 and thus within the vacuum area 115. As is evident from the Figure, the second micro-mirror 5 is larger than the first micro-mirror 3. The first micro-mirror 3 can oscillate along a first oscillation axis 9, and the second micro-mirror 5 can oscillate along a second oscillation axis 11. The first oscillation axis 9 is orthogonal to the second oscillation axis 11. The first and second micro-mirrors 3,5 are supported on (for example attached to) an inner surface 107 of the single ceramic package 70 and arranged such that as both micro-mirrors oscillate about their respective axes, all light 4 which is incident on the first micro-mirror 3 can be deflected to the second minor 5. The first micro-mirror 3 is further arranged such that it can receive light 4 passing through the transparent window 105.

A first and second permanent magnet 111, 113 are located on an outer surface 109 of the single ceramic package 70. The first permanent magnet 111 is positioned in the region of the first micro-mirror 3 and the second permanent magnet 113 is positioned in the region of the second micro-mirror 5. The permanent magnets are used to actuate oscillation of the first and second micro-mirrors 3,5. The permanent magnets 111, 113 create permanent magnetic fields. When a current is applied to coils which cooperate with each mirror, due to the presence of these permanent magnetic fields, a force will be generated along each coil. Since each coil cooperates with a respective minor, the force generated along each coil will induce movement of the mirror.

The device 103 operates in a similar fashion to the device illustrated in FIG. 3. To display the full 2D image 16 on the display screen 14, a modulated laser source, which is preferably connected to a beam combiner, will generate each pixel of the 2-D image to be projected. The first micro-mirror 3 receives light 4 which defines the pixels from a beam combiner. The first micro-mirror 3 is oscillated about the first oscillation axis 9, by an electromagnetic actuation means (not shown) and with the aid of the first permanent magnet 111, to scan the light 4 along the horizontal. The second micro-mirror 5 is simultaneously oscillated about the second oscillation axis 11 by an electromagnetic actuation means (not shown) and with the aid of the second permanent magnet 113, causing the light 4 to be scanned along the vertical. The oscillation of each micro-mirror 3,5 is continuous. The combined effect of the oscillating micro-mirrors 3,5 is to scan the light 4 in a raster, or zig-zag, scanning path across the display screen 14 to project a complete 2-D image, pixel-by-pixel, onto the display screen 14. The speed of oscillation of the micro-mirrors 3,5 is such that, to the viewer, it will appear that the pixels of the 2D image 16 are simultaneously projected onto the display screen 14. The oscillations of the micro-mirrors 3,5 is continuously repeated so that a complete 2D image 16 is visible to the viewer on the display screen 14.

Advantageously, positioning the permanent magnets 111, 113 on an outer surface 109 of the ceramic package 70 enables a reduction in cost of manufacturing the device. Usually, the ceramic package is made by successive layer deposition, each layer being around 100 um in thickness. As the magnets are large and thick, to locate the magnets within the package would require a large size package; the cost of manufacturing a large ceramic package is higher compared to the cost of manufacturing a small sized ceramic package. Smaller magnets could be used to allow for a reduction in the size of the package; however, the actuation of oscillation of the mirrors by smaller magnets is not reliable as the magnetic force generated by a smaller magnet is not are large as the magnetic force generated by a larger magnet. Furthermore, the smaller magnetic force generated by smaller magnets means that the size, or mass, of the minors which can be used in the device, is limited. Advantageously, locating the magnets 111,113 outside of the package allows large magnets to be used without requiring a larger package. Furthermore, the use of a single package formed of ceramic ensures that there is little, or no, parasitic light reflection within the MEMS micro-mirror device 103 during use. Accordingly, a clearer image can be projected by the device onto a display screen.

FIG. 8 illustrates a MEMS micro-mirror device 120 according to a further embodiment of the present invention. The device 120 has many of the same features as the device 103 shown in FIG. 7 and similar features are awarded the same reference numerals.

The MEMS micro-mirror device 120 comprises a first mirror, in the form of a reflective metallic element 121, which is fixed in position within the single package 70, and a micro-mirror 123 which is capable of oscillating along two orthogonal oscillation axes (not shown). It will be understood that the first mirror could take any suitable form and is not restricted to being a metallic element 121, for example the first minor could be a micro-mirror. Both the metallic element 121 and the micro-mirror 123 are located within the single ceramic package 70 and thus within the vacuum area 115. The metallic element 121 and the micro-mirror 123 are each co-operate with an inner surface 107 of the single ceramic package 70; in the particular embodiment shown in FIG. 8 the metallic element 121 is fixed directly to the inner surface 107 of the single ceramic package 70, and the micro-mirror 123 is supported on the inner surface 107 such that it can oscillate about its two orthogonal oscillation axes. The metallic element 121 and the micro-mirror 123 are arranged such that as the micro-mirror oscillates about its oscillation axes, light 4 incident on the metallic element 121 can be deflected to the micro-mirror 123. The metallic element 121 is further arranged such that it can receive light 4 passing through the transparent window 105 of the single ceramic package 70.

A permanent magnet 124 is located on an outer surface 109 of the single ceramic package 70. The permanent magnet 124 is positioned in the region of the micro-mirror 123. The permanent magnet 124 facilitates the actuation of the oscillations of the micro-mirror 123 along its two orthogonal oscillation axis. The permanent magnet 124 creates permanent magnetic field. When a current is applied to coils which cooperate with the micro-mirror 123, due to the presence of the permanent magnetic field, a force will be generated along the coil. Since the coil cooperates with the micro-mirror 123, the force generated along each coil will induce movement of the micro-mirror 123.

To display the full 2D image 16 on the display screen 14, a laser source such as a beam combiner will generate each pixel of the 2-D image to be projected. The metallic element 121 receives light 4 which defines the pixels, from a beam combiner, through the transparent window 105. The metallic element 121 deflects all the light it receives towards the micromirror 123. The micro-mirror 123 is oscillated by an electromagnetic actuation means (not shown) and with the aid of the permanent magnet 124, about its two oscillation axes, to continuously scan the light 4 in a raster (or zig-zag) scanning pattern across the display screen 14 and thus project a complete 2-D image 16, pixel-by-pixel, onto the display screen 14.

Advantageously, since the micro-mirror 123 is capable of oscillating along two orthogonal axes, this obviates the need to provide a second mirror which can oscillate in order to project a 2-D image. Furthermore, positioning the permanent magnet 124 on an outer surface 109 of the ceramic package 70 enables a reduction in the cost of manufacturing the device. Furthermore, the use of single package 70 formed of ceramic ensures that there is little, or no, parasitic light reflection within the MEMS micro-mirror device 120 during use. Accordingly, a clearer image can be projected by the device onto a display screen.

FIG. 9a illustrates a further embodiment which is a variant of the MEMS micro-mirror device 120 shown in FIG. 8. The MEMS micro-mirror device 130 illustrated in FIG. 9a has many of the same features shown in the embodiment of FIG. 8 and like features are awarded the same reference numerals.

The MEMS micro-mirror device 130 illustrated in FIG. 9a comprises a permanent magnet 131 which is arranged to extend across a transparent base member 133 of the single package 139. The permanent magnet 131 may be directly attached to the base member 133. As with the embodiment illustrated in FIG. 8, the permanent magnet 131 facilitates the control of the oscillation of the micro-mirror 123 along its two oscillation axes.

An aperture 135 is provided in the permanent magnet 131. The aperture 135 is configured such that light 4 from an external laser source, such as a beam combiner 137, can pass through the aperture 135 and transparent base member 133 and be received by the metallic element 121. The beam combiner 137 comprises a red laser 151, a blue laser 153 and a green laser 155. The components of the beam combiner 137, for example component 138, are shaped and have surfaces which facilitate the co-operation between the beam combiner 137 and the single package 139.

The MEMS micro-mirror device 130 illustrated in FIG. 9a operates in a similar fashion to the device 120 shown in FIG. 8. However, advantageously, the aperture 135 in the permanent magnet 131 will homogenise the magnetic field along a MEMS electrical coil (not shown) of an electro-magnetic means (not shown) used to oscillate the MEMS mirror 123 about its two oscillation axes. Thus, the aperture 135 will facilitate accurate control of the oscillations of the micro-mirror 123 about its two oscillation axes.

FIG. 9b provides a plan view of the permanent magnet 131 as used in the device shown in FIG. 9a. It is shown that the permanent magnet 131 comprises three prices 131a,131b, 131c, which cooperate to form a single, substantially square, permanent magnet 131. It will be understood that the permanent magnet 131 could comprise any number of pieces, for example the permanent magnet 131 could be a single piece. The permanent magnet creates a permanent magnetic field 150. The direction of the permanent magnetic field 150 created by permanent magnet 131 is shown. The permanent magnetic field is in the direction out of the page in piece 131c and is in the direction into the page in piece 131a. The position (see dashed line) of the micro-mirror 123 with respect to the permanent magnet 131 is also illustrated. When a current is applied to coils which cooperate with the micro-mirror 123, due to the presence of the permanent magnetic field 150, a force will be generated along the coil thereby causing movement of the micro-mirror 123. The aperture 135 in the permanent magnet 131 is further illustrated.

FIG. 10 illustrates a further a MEMS micro-mirror device 101. The device 101 has many of the same features of the device shown in FIG. 3 and similar features are awarded the same reference numerals. The device 101 comprises a single package 7. A first minor, in the form of a reflective element 250, is provided inside the single package 7 and on a tapered edge 27 of the single package. A second minor in the form of a micro-mirror 30 which is configured such that it can oscillate along a two orthogonal oscillation axes, is located within the single package 7. A laser source, in the form of a laser diode chip 29 is secured to a surface 8 of a silicon wafer 18 within the single package 7. Thus, both the micro-mirror 30 and the laser source are located within the single package 7.

In use light 4 is generated in the laser diode chip 29 within the single package 7 and is directed to the reflective element 250. The light 4 generated by the laser diode chip 29 may comprise the pixels of a 2-D image to be displayed. The reflective element 250 deflects the light 4 towards the micromirror 30. The micro-mirror 30 oscillates along two orthogonal oscillation axes to scan the light in a raster scanning pattern along the display screen 14 thereby projecting a 2-D image 16 onto the display screen 14 pixel by pixel.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A MEMS micro-mirror device comprising,
    a single package having a cap member which defines a top surface of the single package and a base member which defines a bottom surface of the single package, the base member comprising a first transparent portion to allow light to enter the single package through the first transparent portion, the cap member comprising a second transparent portion to allow light to exit the single package through the second transparent portion;
    a first mirror and a second mirror located between the cap member and the base member and arranged to deflect light incident on the first mirror to the second mirror, at least one of the first mirror or the second mirror configured to oscillate along an oscillation axis; and one or more magnetic elements, at least one of the one or more magnetic elements to comprise an aperture.

2. The MEMS micro-mirror device according to claim 1, wherein the first mirror configured to oscillate along a first oscillation axis and the second mirror configured to oscillate along a second oscillation axis.

3. The MEMS micro-mirror device according to claim 2, wherein the second oscillation axis is orthogonal to the first oscillation axis.

4. The MEMS micro-mirror device according to claim 1, the at least one of the first mirror or the second mirror configured to oscillate along an oscillation axis is configured to oscillate along a second oscillation axis, the second oscillation axis orthogonal to the first oscillation axis.

5. The MEMS micro-mirror device according to claim 1, comprising one or more reflectors.

6. The MEMS micro-mirror device according to claim 5, the one or more reflectors arranged to deflect light from the first mirror to the second mirror.

7. The MEMS micro-mirror device according to claim 1, wherein one of the first or second mirrors is larger than the other.

8. The MEMS micro-mirror device according to claim 1, wherein the single package comprises a ceramic component.

9. The MEMS micro-mirror device according to claim 1, comprising one or more laser sources positioned within the single package.

10. A method of manufacturing a MEMS micro-mirror device comprising the steps of:
arranging the first mirror and second mirror within the single package, such that at least one of the first mirror or the second mirror is configured to oscillate along an oscillation axis and light incident on the first mirror to be deflected to the second mirror;
providing one or more transparent windows in the single package which enable light to enter the single package through a rear end of the single package; and
providing one or more magnetic elements, at least one of the one or more magnetic elements to comprise an aperture.

11. A MEMS micro-mirror device comprising,
a single package;
a first mirror and second mirror, wherein at least one of the mirrors is configured to oscillate along an oscillation axis;
wherein both mirrors are located within the single package and are arranged such that as the at least one mirror oscillates, the light incident on the first micro-mirror can be deflected to the second mirror;
wherein the single package comprises one or more portions which are transparent to light, and wherein the one or more portions which are transparent to light are arranged to allow light to enter the single package from a rear end of the single package,
wherein the MEMS micro-mirror device further comprises one or more magnetic elements, wherein the or each magnetic element has an aperture.

12. A MEMS micro-mirror device comprising:
a single package comprising a front end and a rear end, the rear end comprising a first transparent portion to allow light to enter the single package through the rear end of the single package, the front end comprising a second transparent portion to allow light to exit the single package through the front end of the single package, the first transparent portion and the second transparent portion lie on different planes;
a first mirror and a second mirror located between the front end and the rear end and arragned to deflect light incident on the first mirror to the second mirror, at least one of the first mirror or the second mirror to be configured to oscillate along an oscillation axis; and
one or more magnetic elements, at least one of the one or more magnetic elements to comprise an aperture.

13. The MEMS micro-mirror device according to claim 12, the first mirror configured to oscillate along a first oscillation axis and the second mirror configured to oscillate along a second oscillation axis.

14. The MEMS micro-mirror device according to claim 13, the second oscillation axis orthogonal to the first oscillation axis.

15. The MEMS micro-mirror device according to claim 12, comprising a reflector to deflect light from the first mirror to the second mirror.

16. The MEMS micro-mirror device according to claim 12, comprising one or more laser sources positioned within the single package.

17. A method comprising:
receiving light from a laser source, the light received through a first transparent portion in a base member of a single package;
deflecting light within the single package, the light at least partially deflected by a first mirror and a second mirror located between the base member and a cap member of the single package;
oscillating at least one of the first mirror or the second mirror along an oscillation axis, the at least one of the first mirror or the second mirror to oscillate at least partially based on a magnetic element comprising an aperture; and
transmitting light from a second transparent portion in the cap member.

18. The method of claim 17, comprising transmitting the light to project the light onto a projection screen.

* * * * *